(12) United States Patent
Gilson et al.

(10) Patent No.: US 11,303,311 B1
(45) Date of Patent: Apr. 12, 2022

(54) RADIO FREQUENCY INTERFACE TO SENSOR

(71) Applicant: Raytheon Technologies Corporation, Farmington, CT (US)

(72) Inventors: Jonathan Gilson, West Hartford, CT (US); Joseph V. Mantese, Ellington, CT (US); Gurkan Gok, Milford, CT (US); Goran Djuknic, New York, NY (US); Coy Bruce Wood, Ellington, CT (US); Joseph B. Wysocki, Somers, CT (US); John A. Needham, Southington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/063,004

(22) Filed: Oct. 5, 2020

(51) Int. Cl.
| | |
|---|---|
| *H04B 1/10* | (2006.01) |
| *G07C 5/08* | (2006.01) |
| *H04B 1/02* | (2006.01) |
| *H04B 1/40* | (2015.01) |

(52) U.S. Cl.
CPC ............ *H04B 1/10* (2013.01); *G07C 5/0816* (2013.01); *H04B 1/02* (2013.01); *H04B 1/40* (2013.01)

(58) Field of Classification Search
CPC ... H04B 1/10; H04B 1/02; H04B 1/40; G07C 5/0816
USPC ........................................................ 455/63.1
See application file for complete search history.

(56) References Cited

U.S. PATENT DOCUMENTS

| | | |
|---|---|---|
| 4,533,884 A | 8/1985 | Hudspeth et al. |
| 5,212,943 A | 5/1993 | Harris |
| 5,479,826 A | 1/1996 | Twerdochlib et al. |
| 5,818,242 A | 10/1998 | Grzybowski et al. |
| 6,717,418 B2 | 4/2004 | Orenstein |
| 7,231,180 B2 | 6/2007 | Benson et al. |
| 7,276,703 B2 | 10/2007 | Berkean et al. |
| 7,688,081 B2 | 3/2010 | Webster |
| 7,722,310 B2 | 5/2010 | Balasubramaniam et al. |
| 7,825,669 B2 | 11/2010 | Parsons et al. |
| 7,890,293 B2 | 2/2011 | Bosselmann et al. |
| 8,121,813 B2 | 2/2012 | Ren et al. |
| 8,552,597 B2 | 10/2013 | Song et al. |
| 8,558,538 B2 | 10/2013 | Phillips et al. |
| 9,057,596 B2 | 6/2015 | Xu et al. |
| 9,303,523 B2 | 4/2016 | Rodriguez et al. |
| 9,677,868 B2 | 6/2017 | Singh et al. |
| 9,986,310 B2 | 5/2018 | Sobanski et al. |
| 10,247,031 B2 | 4/2019 | Carter et al. |

(Continued)

*Primary Examiner* — Lee Nguyen
(74) *Attorney, Agent, or Firm* — Cantor Colburn LLP

(57) ABSTRACT

A radio frequency waveguide communication system includes a controller configured to output a radio frequency signal, and at least one connected node configured to output a node signal indicative of monitored parameter of a machine. The radio frequency waveguide communication system includes a waveguide and a radio frequency interface module. The waveguide is in signal communication with the controller and is configured to guide the radio frequency signal toward the at least one connected node. The radio frequency interface module is configured to establish signal communication between the controller and the at least one connected node, and includes at least one detachable portion configured to detach from the at least one waveguide.

18 Claims, 6 Drawing Sheets

(56) References Cited

U.S. PATENT DOCUMENTS

| | | |
|---|---|---|
| 10,280,787 B2 | 5/2019 | Pratt et al. |
| 10,307,138 B2 | 6/2019 | Heims et al. |
| 10,309,342 B2 | 6/2019 | Mueller et al. |
| 10,316,686 B2 | 6/2019 | Hudson et al. |
| 10,411,756 B2 | 9/2019 | Snyder et al. |
| 2012/0119020 A1 | 5/2012 | Burns et al. |
| 2016/0273973 A1* | 9/2016 | Larsen .................. G01K 11/22 |
| 2017/0335795 A1 | 11/2017 | Klemen et al. |
| 2018/0289359 A1 | 10/2018 | Heims et al. |
| 2018/0294838 A1 | 10/2018 | Snyder et al. |
| 2019/0250058 A1 | 8/2019 | Schofield |

\* cited by examiner

RADIO FREQUENCY INTERFACE TO SENSOR

BACKGROUND

This disclosure relates to electromagnetic communication, and more particularly to a radio frequency signal communication in a vehicle.

Detailed knowledge of machinery operation for control and/or health monitoring of a vehicle typically require sensing systems capable of obtaining information from locations that are sometimes difficult to access due to moving parts, internal operating environment and/or machine configuration. The access limitations make wire routing bulky, expensive and vulnerable to interconnect failures. The sensor and interconnect operating environments for desired sensor locations often exceed the capability of the interconnect systems. In some cases, cable cost, volume and weight exceed the desired limits for practical applications.

Application of electromagnetic sensor and effector technologies to address the wiring constraints faces the challenge of providing reliable communications in a potentially unknown environment with potential interference from internal or external sources. Large-scale deployments of multiple sensors and/or effectors with varying signal path lengths further increases the challenges of normal operation and fault detection in a network of connected nodes. High temperature environments further constrain sensor system components.

BRIEF DESCRIPTION

According to a non-limiting embodiment, a radio frequency waveguide communication system includes a controller configured to output a radio frequency signal, and at least one sensor configured to output a sensor signal indicative of monitored parameter of a machine. The radio frequency waveguide communication system includes a waveguide and a radio frequency interface module. The waveguide is in signal communication with the controller and is configured to guide the radio frequency signal toward the at least one sensor. The radio frequency interface module is configured to establish signal communication between the controller and the at least one sensor, and includes at least one detachable portion configured to detach from the at least one waveguide.

In addition to one or more of the features described above or below, or as an alternative, further embodiments may include where the radio frequency interface module is configured to generate a data signal based on the radio frequency signal and to deliver the data signal to the at least one sensor.

In addition to one or more of the features described above or below, or as an alternative, further embodiments may include where the radio frequency interface module is configured to convert the sensor signal into a radio frequency signal and deliver the converted radio frequency signal to the controller.

In addition to one or more of the features described above or below, or as an alternative, further embodiments may include where the radio frequency interface module comprises a smart node configured to generate the data signal, and a radio frequency adapter including the at least one detachable portion.

In addition to one or more of the features described above or below, or as an alternative, the smart node comprises at least one antenna, and a transceiver processor configured to convert the radio frequency signal into a data signal compatible with the at least one sensor and to convert the sensor signal into an radio frequency signal.

In addition to one or more of the features described above or below, or as an alternative, further embodiments may include where the at least one antenna and the transceiver processor are formed on a printed circuit board disposed within the conduit of the at least one waveguide.

In addition to one or more of the features described above or below, or as an alternative, the radio frequency adapter comprises an adapter housing configured to support a wiring network including one or more lead wires, a sub-flange configured to couple the adapter housing to the distal end of the conduit, and an interface sensor node including an adapter end configured to establish connection to the adapter housing and a node end configured to establish connection to the at least one sensor.

In addition to one or more of the features described above or below, or as an alternative, further embodiments may include where the interface sensor node includes at least one wire lead pathway configured to convey a lead wire from the adapter end to the node end.

In addition to one or more of the features described above or below, or as an alternative, further embodiments may include where the at least one lead wire includes a first wire end in signal communication with the transceiver and an opposing second end in signal communication with the at least one node.

In addition to one or more of the features described above or below, or as an alternative, further embodiments may include where the second end is connected to an intermediate connector interposed between the radio frequency adapter and the at least one node.

In addition to one or more of the features described above or below, or as an alternative, further embodiments may include where the intermediate connector includes a first connector end that establishes signal communication with the node interface and an opposing second connector end that establishes signal communication with the at least one node.

In addition to one or more of the features described above or below, or as an alternative, further embodiments may include where the interface node, the adapter housing, and the sub-flange are fabricated as a single integral component such that the radio frequency adapter is configured to detach completely from the at least one waveguide.

In addition to one or more of the features described above or below, or as an alternative, further embodiments may include where the interface node, the adapter housing, and the sub-flange are separate individual components, and wherein the interface node is configured to detach from the adapter housing.

According to another non-limiting embodiment, a radio frequency interface module comprises at least one detachable portion configured to detach from at least one waveguide. The radio frequency interface module is configured to generate a data signal based on the radio frequency signal and to deliver the data signal to the at least one node.

In addition to one or more of the features described above or below, or as an alternative, further embodiments the radio frequency interface module comprises a smart node configured to generate the data signal, and a radio frequency adapter including the at least one detachable portion.

In addition to one or more of the features described above or below, or as an alternative, the smart node comprises at least one antenna, and a transceiver processor configured to convert the radio frequency signal into a data signal compatible with the at least one node and to convert the node signal into an radio frequency signal.

In addition to one or more of the features described above or below, or as an alternative, further embodiments may include where the at least one antenna and the transceiver processor are formed on a printed circuit board disposed within the conduit of the at least one waveguide.

In addition to one or more of the features described above or below, or as an alternative, the radio frequency adapter comprises an adapter housing configured to support a wiring network including one or more lead wires, a sub-flange configured to couple the adapter housing to the distal end of the conduit, and an interface node including an adapter end configured to establish connection to the adapter housing and a node end configured to establish connection to the at least one node.

In addition to one or more of the features described above or below, or as an alternative, further embodiments may include where the interface node includes at least one wire lead pathway configured to convey a lead wire from the adapter end to the node end.

In addition to one or more of the features described above or below, or as an alternative, further embodiments may include where the at least one lead wire includes a first wire end in signal communication with the transceiver and an opposing second end in signal communication with the at least one node.

A technical effect of the of the present teachings described herein is achieved by providing an RF interface module that dynamically establishes an interchangeable communication interface between an RF-based controller and one or more nodes (e.g. sensors) included in a connected node of an RF waveguide communication system.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Application of electromagnetic sensor and effector technologies to address the wiring constraints faces the challenge of providing reliable communications in a potentially unknown environment with potential interference from internal or external sources. RF waveguide communications and power systems employed in gas turbine engine systems, for example, can offer higher bandwidth, reduced weight, smaller footprint, and greater reliability. However, a wide range of nodes (e.g., sensors, actuators, effectors, etc.) may have been designed, qualified and implemented for on-engine use which are not configured with a waveguide interface.

At least one or more non-limiting embodiments described herein provide an RF interface module configured to adapt one or more nodes with a RF waveguide communications and power system. In one or more non-limiting embodiments, the nodes can include both passive nodes and active nodes using, for example, a bayonet type connector interface. The RF interface module includes a smart node and an RF adapter. The smart node is configured to convert an RF signal into a digital or analog system compatible with a protocol for which the node is designed to communicate over, and to convert the output node signal (e.g., a digital signal or analog signal) into an RF signal. The RF adapter is configured to relay the converted signals to and from the nodes. The RF adapter includes a detachable portion that can be interchanged with different connector interfaces that mate or are compatible with various nodes such that an RF signal information can be properly communicated to various types of nodes. In this manner, the need to redesign and requalify an entire node suite used on a given platform may be avoided.

Figure 1:
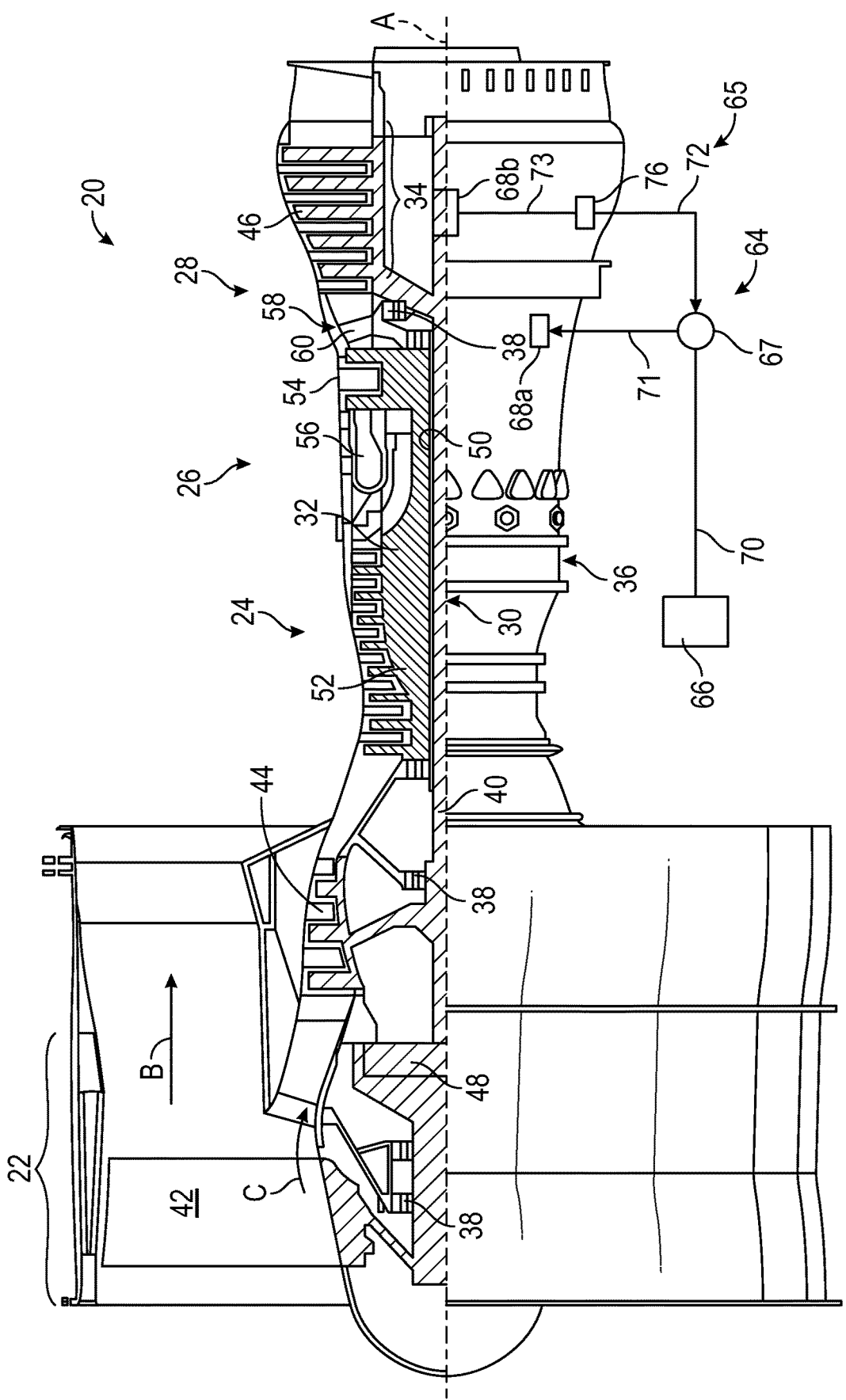
FIG. 1 is a cross-sectional view of a gas turbine engine as an example of a machine according to a non-limiting embodiment of the disclosure.

Various embodiments of the present disclosure are related to electromagnetic communication through and to components of a machine. FIG. 1 schematically illustrates a gas turbine engine 20 as one example of a machine as further described herein. The gas turbine engine 20 is depicted as a two-spool turbofan that generally incorporates a fan section 22, a compressor section 24, a combustor section 26 and a turbine section 28. The fan section 22 drives air along a bypass flow path B in a bypass duct to provide a majority of the thrust, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures or any other machine that requires nodes (e.g., sensors, actuators, effectors, etc.) to operate with similar environmental challenges or constraints. Additionally, the concepts described herein may be applied to any machine or system comprised of control and/or health monitoring systems. Examples can include various moderate to high temperature environments, such as glass and metal forming systems, petroleum-oil-and-gas (POG) systems, ground-based turbine for energy generation, nuclear power systems, and transportation systems.

With continued reference to FIG. 1, the exemplary engine 20 generally includes a low speed spool 30 and a high-speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high-speed spool 32 includes an outer shaft 50 that interconnects a second (or high) pressure compressor 52 and a second (or high) pressure turbine 54. A combustor 56 is arranged in exemplary gas turbine engine 20 between the high-pressure compressor 52 and the high-pressure turbine 54. A mid-turbine frame 58 of the engine static structure 36 is arranged generally between the high-pressure turbine 54 and the low-pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low-pressure compressor 44 then the high-pressure compressor 52, mixed and burned with fuel in the combustor 56, then expanded over the high-pressure turbine 54 and low-pressure turbine 46. The mid-turbine frame 58 includes airfoils 60 which are in the core airflow path C. The turbines 46, 54 rotationally drive the respective low speed spool 30 and high-speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48. In direct drive configurations, the gear system 48 can be omitted.

The engine 20 in one example is a high-bypass geared aircraft engine. Low pressure turbine 46 pressure ratio is pressure measured prior to inlet of low-pressure turbine 46 as related to the pressure at the outlet of the low-pressure turbine 46 prior to an exhaust nozzle. A significant amount of thrust can be provided by the bypass flow B due to the high bypass ratio. The example low pressure turbine 46 can provide the driving power to rotate the fan section 22 and therefore the relationship between the number of turbine rotors 34 in the low-pressure turbine 46 and the number of blades in the fan section 22 can establish increased power transfer efficiency.

The disclosed example gas turbine engine 20 includes a control and health monitoring system 64 (generally referred to as system 64) utilized to monitor component performance and function. The system 64 includes a network 65, which is an example of a guided electromagnetic transmission network. The network 65 includes a controller 66 operable to communicate with connected nodes 68a, 68b through electromagnetic signals. The nodes 68a, 68b can be distributed throughout the gas turbine engine 20 or other such machine. Node 68a is an example of an effector node that can drive one or more effectors/actuators of the gas turbine engine 20. Node 68b is an example of a sensor node that can interface with one or more sensors of the gas turbine engine 20. Nodes 68a, 68b can include processing support circuitry to transmit/receive electromagnetic signals between sensors or effectors and the controller 66. A coupler 67 can be configured as a splitter between a waveguide 70 coupled to the controller 66 and waveguides 71 and 72 configured to establish guided electromagnetic transmission communication with nodes 68a and 68b respectively. The coupler 67 can be a simple splitter or may include a repeater function to condition electromagnetic signals sent between the controller 66 and nodes 68a, 68b. In the example of FIG. 1, a radio frequency-based repeater 76 is interposed between the coupler 67 and node 68b, where waveguide 72 is a first waveguide coupled to the coupler 67 and radio frequency-based repeater 76, and waveguide 73 is a second waveguide coupled to the radio frequency-based repeater 76 and node 68b. Collectively, waveguides 70, 71, 72, 73 are configured to guide transmission of the electromagnetic signals between the controller 66 and one or more of the nodes 68a, 68b. The transmission media within waveguides 70-73 may include dielectric or gaseous material. In embodiments, the waveguides 70-73 can be hollow metal tubes. The disclosed system 64 may be utilized to control and/or monitor any component function or characteristic of a turbomachine, aircraft component operation, and/or other machines.

Prior control & diagnostic system architectures utilized in various applications include centralized system architecture in which the processing functions reside in an electronic control module. Redundancy to accommodate failures and continue system operation systems can be provided with dual channels with functionality replicated in both control channels. Actuator and sensor communication are accomplished through analog wiring for power, command, position feedback, sensor excitation and sensor signals. Cables and connections include shielding to minimize effects caused by electromagnetic interference (EMI). The use of analog wiring and the required connections limits application and capability of such systems due to the ability to locate wires, connectors and electronics in small and harsh environments that experience extremes in temperature, pressure, and/or vibration. Exemplary embodiments can use radio frequencies guided by the waveguides 70-73 in a guided electromagnetic transmission architecture to provide both electromagnetic signals and power to the individual elements of the network 65.

The use of electromagnetic radiation in the form of radio waves (e.g., ranging from MHz to GHz) to communicate and power the sensors and effectors using a traditionally complex wired system provides substantial architectural simplification, especially as it pertains to size, weight, and power (SWaP). Embodiments provide extension of a network where reduced SNR would compromise network performance by trading off data rates for an expansion of the number of nodes and distribution lines; thereby enabling more nodes/sensors, with greater interconnectivity.

Figure 2:
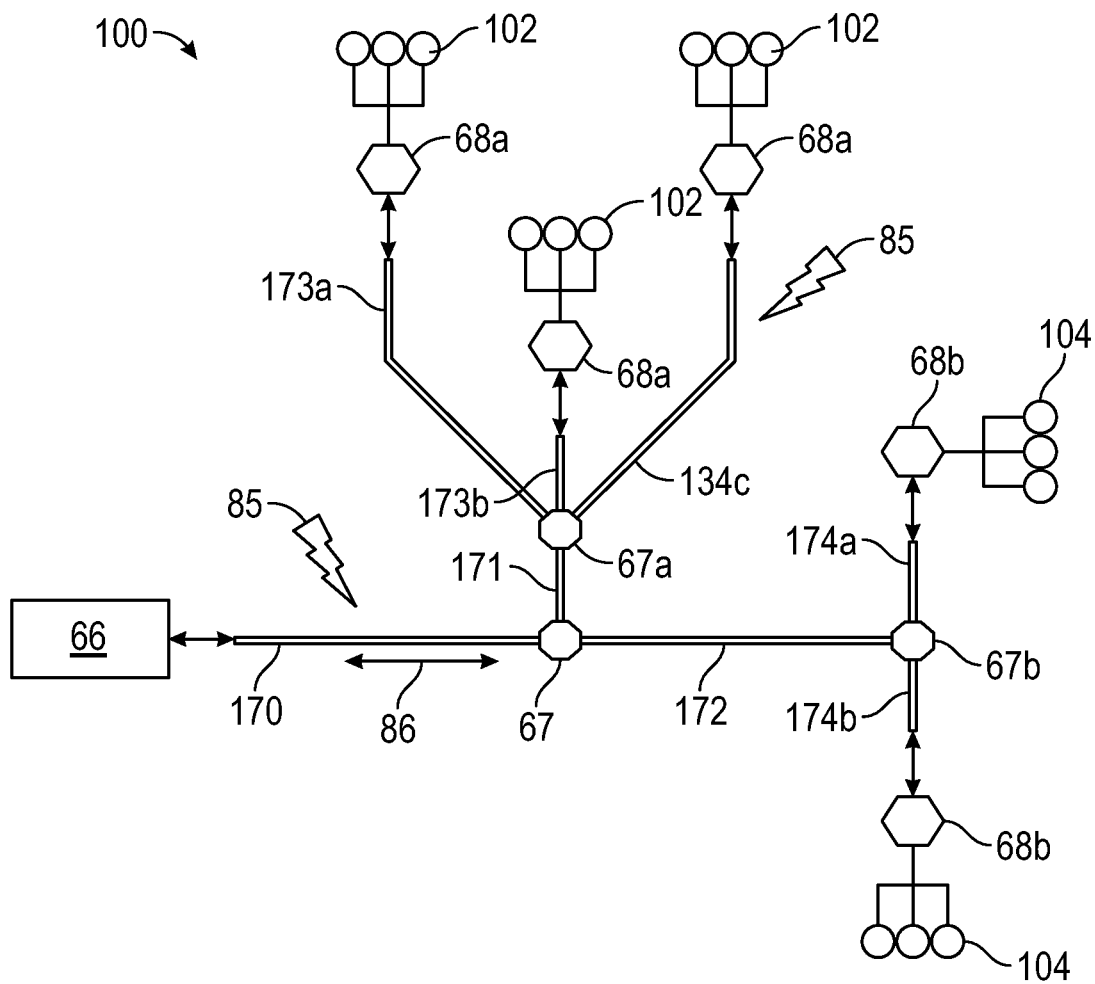
FIG. 2 is a schematic view of a guided electromagnetic transmission network in accordance with an embodiment of the disclosure.

Referring to FIG. 2, a guided electromagnetic transmission network 100 is depicted as an example expansion of the network 65 of FIG. 1. The guided electromagnetic transmission network 100 can include the controller 66 coupled to coupler 67 through waveguide 170. The coupler 67 is further coupled to coupler 67a through waveguide 171 and to coupler 67b through waveguide 172. Couper 67a is further coupled to three nodes 68a through waveguides 173a, 173b, 173c in parallel. Each of the nodes 68a can interface or be combined with multiple effectors 102. Coupler 67b is also coupled to two nodes 68b through waveguides 174a, 174b in parallel. Each of the nodes 68b can interface or be combined with multiple sensors 104. Although the example of FIG. 2 depicts connections to effectors 102 and sensors 104 isolated to different branches, it will be understood that effectors 102 and sensors 104 can be interspersed with each other and need not be isolated on dedicated branches of the guided electromagnetic transmission network 100. Couplers 67, 67a, 67b can be splitters and/or can incorporate instances of the radio frequency-based repeater 76 of FIG. 1. Further, one or more instances of the radio frequency-based repeater 76 can be installed at any of the waveguides 170, 171, 172, 173a-c, and/or 174a-b depending on the signal requirements of the guided electromagnetic transmission network 100.

Nodes 68a, 68b can be associated with particular engine components, actuators or any other machine part from which information and communication is performed for monitoring and/or control purposes. The nodes 68a, 68b may contain a single or multiple electronic circuits or sensors configured to communicate over the guided electromagnetic transmission network 100.

The controller 66 can send and receive power and data to and from the nodes 68a, 68b. The controller 66 may be located on equipment near other system components or located remotely as desired to meet application requirements.

A transmission path (TP) between the controller 66 and nodes 68a, 68b can be used to send and receive data routed through the controller 66 from a control module or other components. The TP may utilize electrical wire, optic fiber, waveguide or any other electromagnetic communication including radio frequency/microwave electromagnetic energy, visible or non-visible light. The interface between the controller 66 and nodes 68a, 68b can transmit power and signals.

The example nodes 68a, 68b may include radio-frequency identification (RFID) devices along with processing, memory and/or the interfaces to connect to conventional sensors, actuators, or effectors, such as solenoids or electrohydraulic servo valves. The waveguides 170, 171, 172, 173a-c, and/or 174a-b can be shielded paths that support electromagnetic communication, including, for instance, radio frequency, microwaves, magnetic or optic waveguide transmission. Shielding can be provided such that electromagnetic energy or light interference 85 with electromagnetic signals 86 (shown schematically as arrows) are mitigated in the guided electromagnetic transmission network 100. Moreover, the shielding provides that the electromagnetic signals 86 are less likely to propagate into the environment outside the guided electromagnetic transmission network 100 and provide unauthorized access to information. In some embodiments, guided electromagnetic radiation is in the range 1-100 GHz. Electromagnetic radiation can be more tightly arranged around specific carrier frequencies, such as 3-4.5 GHz, 24 GHz, 60 GHz, or 76-77 GHz as examples in the microwave spectrum. A carrier frequency can transmit electric power, as well as communicate information, to multiple nodes 68a, 68b using various modulation and signaling techniques.

The nodes 68a with effectors 102 may include control devices, such as a solenoid, switch or other physical actuation devices. RFID, electromagnetic or optical devices implemented as the nodes 68b with sensors 104 can provide information indicative of a physical parameter, such as pressure, temperature, speed, proximity, vibration, identification, and/or other parameters used for identifying, monitoring or controlling component operation. Signals communicated in the guided electromagnetic transmission network 100 may employ techniques such as checksums, hash algorithms, error control algorithms and/or encryption to mitigate cyber security threats and interference.

The shielding in the guided electromagnetic transmission network 100 can be provided such that power and communication signals are shielded from outside interference, which may be caused by environmental electromagnetic or optic interference. Moreover, the shielding limits intentional interference 85 with communication at each component. Intentional interference 85 may take the form of unauthorized data capture, data insertion, general disruption and/or any other action that degrades system communication. Environmental sources of interference 85 may originate from noise generated from proximate electrical systems in other components or machinery along with electrostatic and magnetic fields, and/or any broadcast signals from transmitters or receivers. Additionally, environmental phenomena, such as cosmic radio frequency radiation, lightning or other atmospheric effects, could interfere with local electromagnetic communications.

It should be appreciated that while the system 64 is explained by way of example with regard to a gas turbine engine 20, other machines and machine designs can be modified to incorporate built-in shielding for monitored or controlled components in a guided electromagnetic transmission network. For example, the system 64 can be incorporated in a variety of harsh environment machines, such as an elevator system, heating, ventilation, and air conditioning (HVAC) systems, manufacturing and processing equipment, a vehicle system, an environmental control system, and all the like. As a further example, the system 64 can be incorporated in an aerospace system, such as an aircraft, rotorcraft, spacecraft, satellite, or the like. The disclosed system 64 includes the network 65, 100 that provides consistent communication with electromagnetic devices, such as the example nodes 68a, 68b, and removes variables encountered with electromagnetic communications such as distance between transmitters and receiving devices, physical geometry in the field of transmission, control over transmission media such as air or fluids, control over air or fluid contamination through the use of filtering or isolation and knowledge of temperature and pressure.

The system 64 provides for a reduction in cable and interconnecting systems to reduce cost and increases reliability by reducing the number of physical interconnections. Reductions in cable and connecting systems further provides for a reduction in weight while enabling additional redundancy without significantly increasing cost. Moreover, additional nodes can be added without the need for additional wiring and connections that provide for increased system accuracy and response. Finally, the embodiments may provide a "plug-n-play" approach to add a new node, potentially without a requalification of the entire system but only the new component; thereby greatly reducing qualification costs and time.

Figure 3:
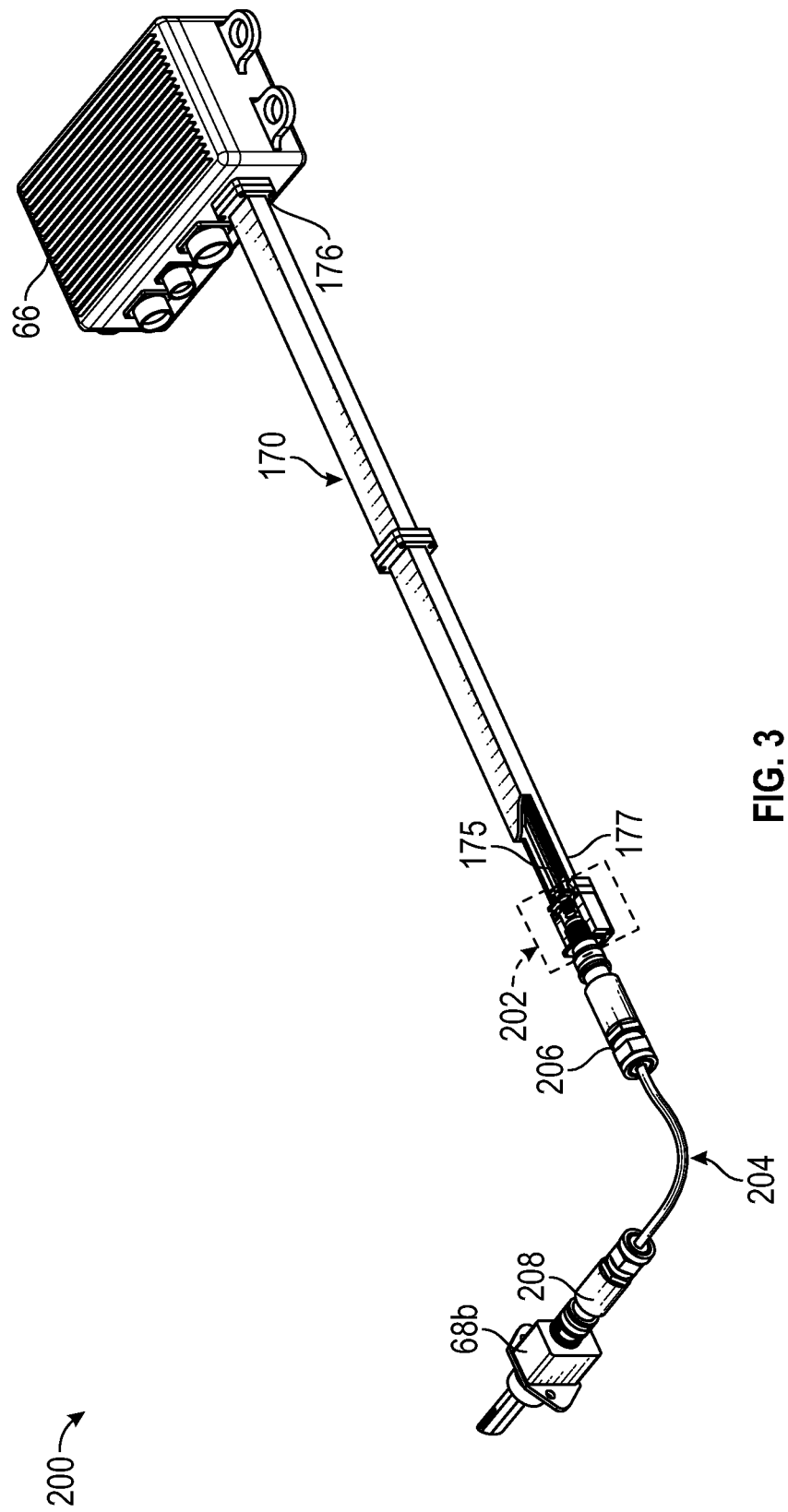
FIG. 3 depicts a radio frequency (RF) waveguide communication system included in the guided electromagnetic transmission network shown in FIG. 2 and implementing an RF interface module according to a non-limiting embodiment of the disclosure.

Turning now to FIG. 3, an RF waveguide communication system 200 is illustrated according to a non-limiting embodiment. The RF waveguide communication system 200 includes one or more connected nodes 68b (e.g., sensors), a controller 66, a waveguide 170, and an RF interface module 202. Although a single connected node 68b and single waveguide 170 are shown, it should be appreciated that additional nodes 68b and/or waveguides 170 can be employed in the RF waveguide communication system 200 without departing from the scope of the invention. Going forward, the node 68b will be described as a sensor node 68b. It should be appreciated that other types of nodes such as actuators and/or effectors, for example, can be employed without departing from the scope of the invention.

The sensor node 68b can include various digital or analog sensors configured to monitor the machine and output one or more sensor signals indicative of the monitored state or measured parameters (e.g., speed, temperature, pressure, frequency, power, voltage, current, etc.) of a machine (e.g., gas turbine engine).

The controller 66 is configured to output an electromagnetic signal such as, for example, an RF signal. The RF signal has a frequency ranging, for example, from about 1 gigahertz (GHz) to about 100 GHz. The controller 66 can be constructed as an electronic hardware controller that includes memory and a processor configured to execute algorithms and computer-readable program instructions stored in the memory. In one or more non-limiting embodiments, the controller 66 is a full authority digital engine controller (FADEC) configured to control one or more processes of the machine and perform one or more signal processing operations and data analysis operations based, at least in part, on the sensor signal output from the sensor node 68b.

The waveguide 170 includes a hollow conduit 175 that serves as an RF channel configured to guide the transmission of the RF signal toward the sensor 68b. The conduit 175 includes a proximate end 176 coupled to the controller 66 and a distal end 177 coupled to the RF interface module 202. The conduit 175 extends from the proximate end 176 to the distal end 177 to define a channel length.

The RF interface module 202 is interposed between the waveguide 170 and the sensor node 68b. Accordingly, the RF interface module 202 is configured to convert the RF signal generated by the controller 66 into a data signal, and convert the sensor signal output from the sensor node 68b into an RF signal as described in greater detail below. The data signal includes a digital signal and/or an analog signal depending on the type of sensor node 68b, e.g., whether the sensor node 68b includes a digital sensor or an analog sensor. In this manner, the RF interface 202 can establish electrical communication between the controller 66 and the sensor 68b, even when the sensor 68b operates according to digital or analog protocols but is not designed to directly operate according to RF signals.

In one or more non-limiting embodiments, the RF waveguide communication system 200 can employ an intermediate connector 204 to establish a wired connection between the sensor node 68b and the RF interface module 202. The intermediate connector 204 can include a first connector end 206 that establishes signal communication with the RF interface module 202 and an opposing second connector end 208 that establishes signal communication with the sensor node 68b.

Figure 4:
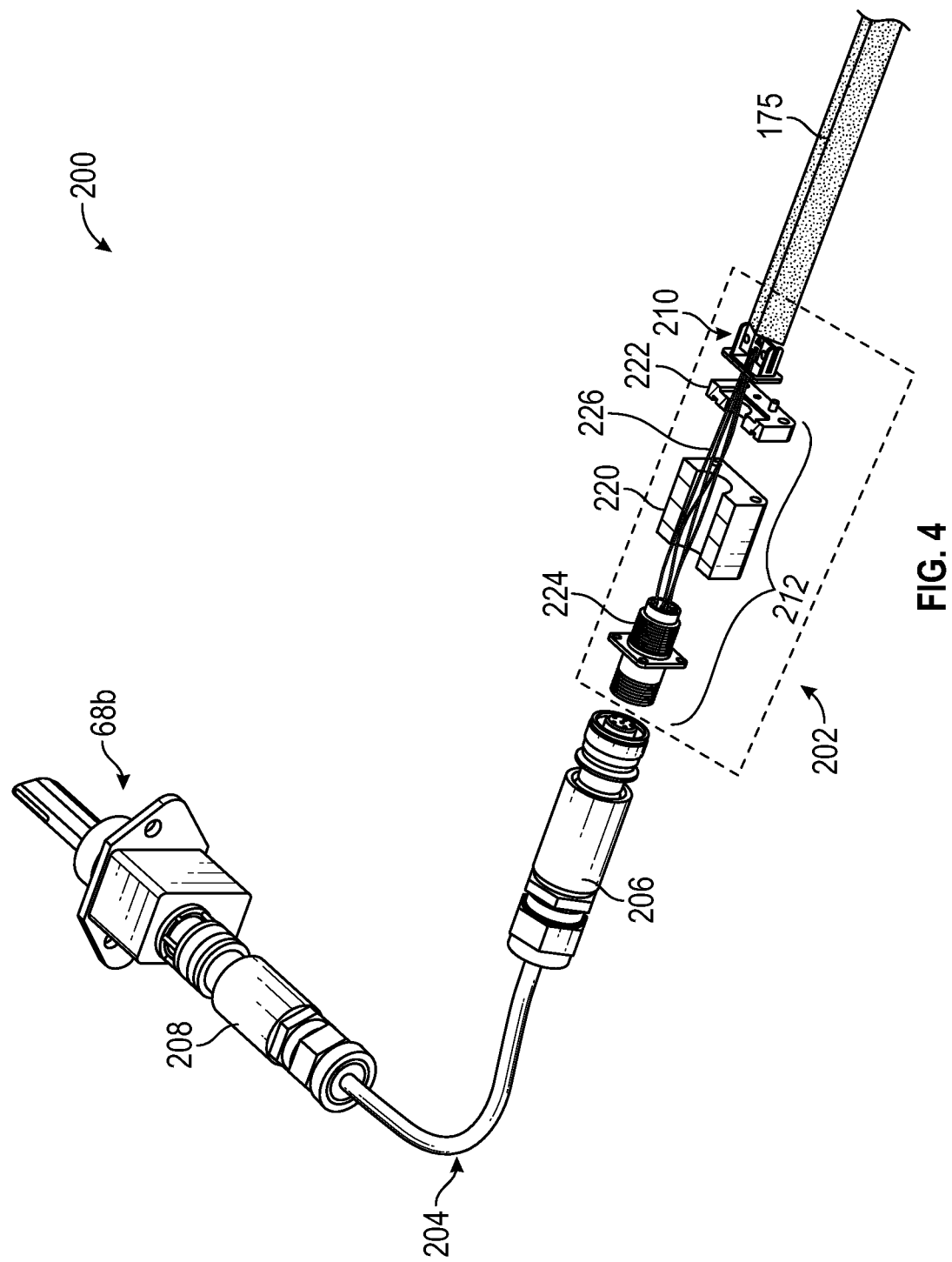
FIG. 4 depicts an exploded view of the RF interface module establishing a wired connection between a connected node and a transmitter according to a non-limiting embodiment of the disclosure.
Figure 5:
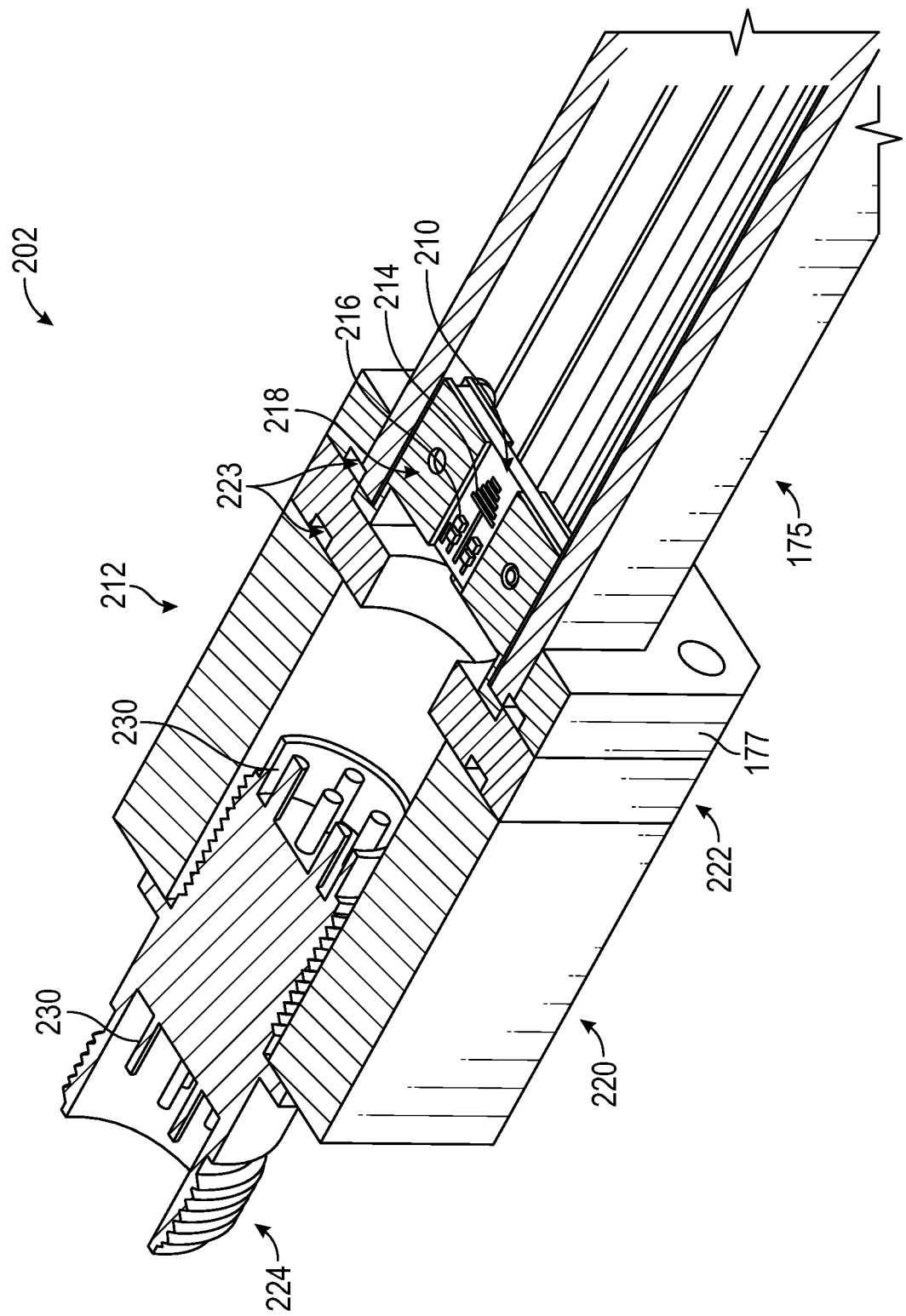
FIG. 5 is a close-up assembled view of the RF interface module according to a non-limiting embodiment shown in FIGS. 3 and 4 according to a non-limiting embodiment of the disclosure.
Figure 6:
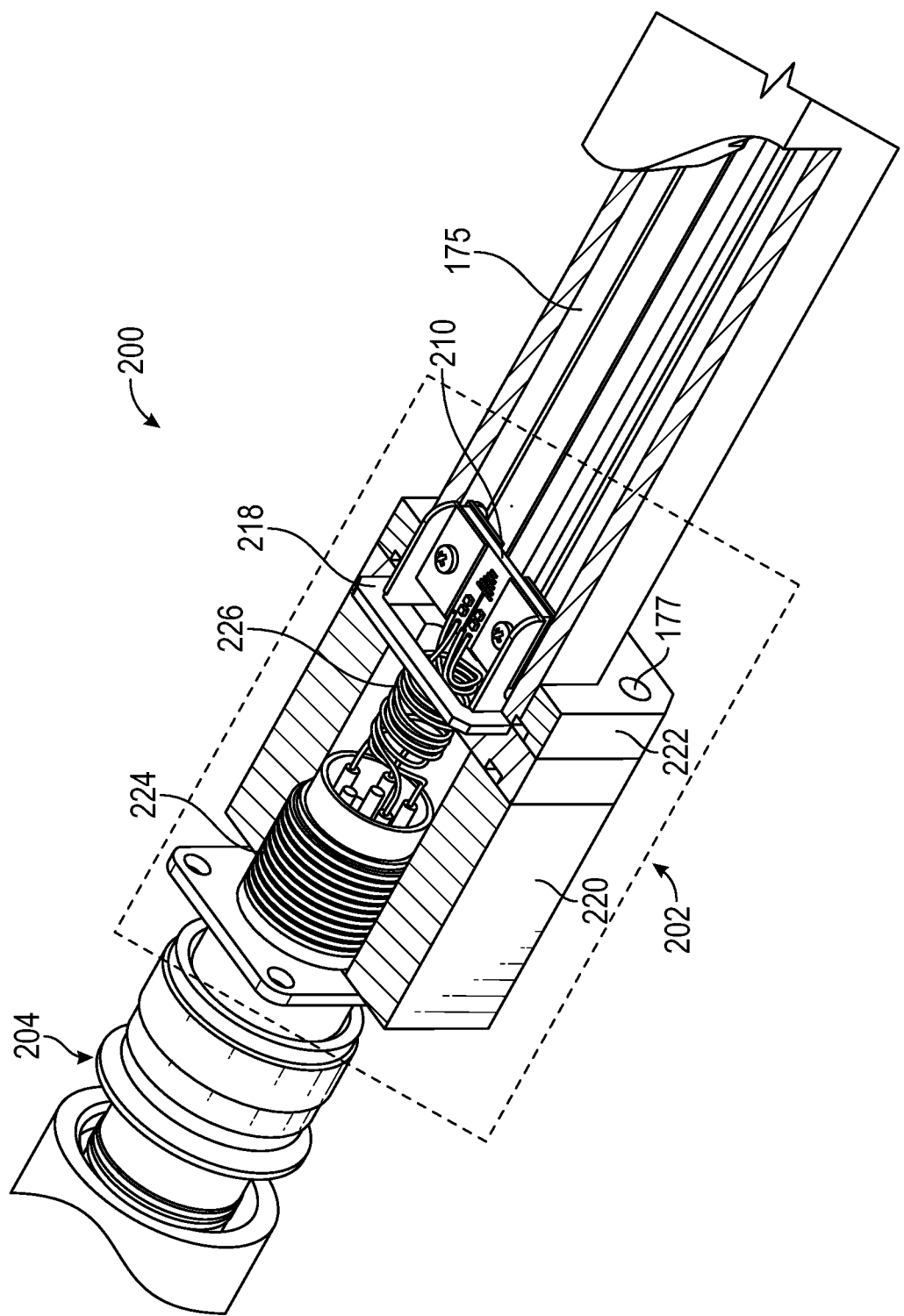
FIG. 6 is a close-up assembled view of the RF interface module shown in FIG. 5 feeding lead wires through the RF adapter according to a non-limiting embodiment of the disclosure.

Referring collectively to FIGS. 4, 5 and 6, the RF interface module 202 is illustrated according to a non-limiting embodiment. The RF interface 202 includes a smart node 210 and an RF adapter 212. The smart node 210 is configured to facilitate compatibility between a digital or analog data protocol of a sensor included in the sensor node 68b and the RF data protocol of the controller 66.

The smart node 210 includes one or more antennas 214 and a transceiver processor 216 (see FIG. 5). The antenna 214 is configured to transmit and receive a RF signal to and from the smart node 210. The transceiver processor 216 is configured to convert the RF signal into a data signal (e.g., a digital signal or analog signal) that is compatible with a sensor included in the sensor node 68b. Similarly, the transceiver processor 216 is also configured to convert the output sensor signal (e.g., a digital or analog output signal) into an RF signal.

In one or more non-limiting embodiments, the antenna 214 and transceiver processor 216 are formed on a surface of a printed circuit board (PCB) that is supported by a PCB bracket 218. The PCB bracket 218 can be coupled to the waveguide 170 such that the transceiver processor 216 and/or the antenna 214 are disposed within the waveguide conduit 175. In a non-limiting embodiment of the disclosure, opposing slots are formed in sidewalls that extend vertically between a lower surface and upper surface of the waveguide conduit 175. The slots can receive the PCB bracket 218 such that the surface of the PCB board and the PCB bracket 218 are parallel with the lower and upper surfaces of the waveguide conduit 175.

The RF signals can be exchanged between the smart node 210 and the controller 66. For example, the controller 66 is capable of selecting one or more of the sensor nodes (e.g., sensor node 68b) included in the system 200 for interrogation and can command the smart node 210 to transmit one or more interrogation frequencies associated to a selected sensor node 68b. Sensor interrogation includes, for example, a process to determine whether a node (e.g., sensor node 68b) is working properly by sending a signal through the node and monitoring the response. The response can indicate whether the node (e.g., sensor, actuator, effector, etc.) is cracked, broken, clogged, seized, or otherwise not operating properly The interrogation frequencies can be pure tones that provoke a resonance response in an associated sensor node 68b which returns one or more sensor frequencies indicative of one or more sensed values. A sensor included in the sensor node 68b can be identified by the frequency closeness of a tone to a designated resonant frequency. In this way, multiple sensors can be simultaneously interrogated and analyzed.

The RF adapter 212 includes an adapter housing 220, a sub-flange 222, and an interface sensor node 224. The adapter housing 220, sub-flange 222, and interface sensor node 224 can be from a rigid material including, but not limited to, metal, or a high-temperature resistant polymer. In some non-limiting embodiments, the adapter housing 220, sub-flange 222, and interface sensor node 224 are fabricated as a single integral component using, for example, additive manufacturing techniques (e.g., three-dimensional printing). In other non-limiting embodiments, the adapter housing 220, sub-flange 222, and interface sensor node 224 are implemented as separate individual components. In any case the RF adapter 212 includes at least one detachable portion, which allows the RF adapter 212 to provide a dynamically interchangeable signal communication interface between the controller 66 and the sensor node 68b as discussed in greater detail below.

The adapter housing 220 is configured to support a wiring network 226 including one or more lead wires. The sub-flange 222 includes a first side that couples to the adapter housing 220 and an opposing second side that couples to the distal end 177 of the waveguide conduit 175. In one or more non-limiting embodiments, the sub-flange 222 can be connected and disconnected from the waveguide conduit 175. In this manner, the entire adapter housing 220 can be interchanged with a different adapter housing having a different pin arrangement) by interchanging the sub-flange 222. The sub-flange 222 can also include one or more O-ring seal grooves 223, which seal the internal adapter housing 220 from external environmental conditions such as moisture, dust, etc.

The interface sensor node 224 including an adapter end and a sensor end. The adapter end is configured to establish a connection to the adapter housing 220, while the sensor end is configured to establish a connection to the sensor node 68*b*. In one or more non-limiting embodiments, the interface sensor node 224 includes one or more wire lead pathways 230 (see FIG. 5). The wire lead pathways 230 are configured to convey (e.g., pass through) a lead wire from the adapter end to the sensor end. For example, a lead wire can include a first wire end connected to the smart node 210 (e.g., the transceiver processor 216) and an opposing second wire end connected to the sensor node 68*b* or some cases the intermediate connector 204 (see FIGS. 4 and 6).

The interface sensor node 224 can include a variety of connector interfaces including, but not limited to, a universal serial bus (USB) connector interface, a fiber optic connector interface, a co-axial cable connector interface, a bayonet connector, or various known U.S. military standard electrical connector interfaces (e.g., a MIL-DTL-5015 connector interface, a MIL-DTL-83723 connector interface, etc.). In one or more non-limiting embodiments, the interface sensor node 224 can be coupled to the adapter housing 220 in a manner that allows the interface sensor node 224 to be interchanged, e.g., detached and replaced. For instance, the interface sensor node 224 can be clipped, snapped, screwed, etc., to the adapter housing 220, thereby allowing it to be detached and replaced, either with the same type of interface sensor node 224 (in cases where it is damaged or contains a fault) or with a completely different type of interface sensor node 224 that is compatible or mate with a different sensor added to one or more of the sensor node 68*b*. In this manner, the interface sensor node 224 can be readily interchanged to provide different interfaces for different types of sensors included in the sensor node 68*b*. In cases where the adapter housing 220, sub-flange 222, and interface sensor node 224 are integrated as a single component, the sub-flange 222 can be coupled to the waveguide conduit 175 (e.g., screwed, snapped, clipped, etc.) such that the entire RF adapter 212 can be detached from the waveguide conduit 175 and readily interchanged or replaced to match the compatibility of a sensor included in the sensor node 68*b*.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A radio frequency waveguide communication system, comprising:
    a controller configured to communicate using a radio frequency signal;
    at least one connected node configured to output a node signal indicative of a monitored parameter of a machine;
    at least one waveguide operatively coupled between the controller and the at least one connected node to guide the radio frequency signal;
    a radio frequency interface module configured to receive the node signal and to communicate with the controller using the radio frequency signal, the radio frequency interface including at least one detachable portion configured to detach from the at least one waveguide.

2. The radio frequency waveguide communication system of claim 1, wherein the radio frequency interface module is configured to generate a data signal based on the radio frequency signal and to send the data signal to the at least one connected node.

3. The radio frequency waveguide communication system of claim 2, wherein the radio frequency interface module is configured to generate a radio frequency signal based on the node signal and send the generated radio frequency signal to the controller.

4. The radio frequency waveguide communication system of claim 3, wherein the radio frequency interface module comprises:
    a node configured to generate the data signal; and
    a radio frequency adapter including the at least one detachable portion.

5. The radio frequency waveguide communication system of claim 4, wherein the smart node comprises:
    at least one antenna; and
    a transceiver processor configured to generate the data signal based on the radio frequency signal, the data signal being compatible with the at least one connected node and to generate a radio frequency signal based on the node signal.

6. The radio frequency waveguide communication system of claim 5, wherein the at least one antenna and the transceiver processor are disposed on a printed circuit board disposed in the conduit of the at least one waveguide.

7. The radio frequency waveguide communication system of claim 4, wherein the radio frequency adapter comprises:
    an adapter housing configured to support a wiring network including one or more lead wires;
    a sub-flange configured to couple the adapter housing to the distal end of the conduit; and
    an interface node including an adapter end configured to communicate with the adapter housing and a node end configured to establish connection to the at least one connected node.

8. The radio frequency waveguide communication system of claim 7, wherein the interface sensor node includes at least one wire lead pathway configured to convey a lead wire from the adapter end to the node end.

9. The radio frequency waveguide communication system of claim 8, wherein the at least one lead wire includes a first wire end in signal communication with the transceiver and an opposing second end in signal communication with the at least one connected node.

10. The radio frequency waveguide communication system of claim 9, wherein the second end is connected to an intermediate connector interposed between the radio frequency adapter and the at least one connected node.

11. The radio frequency waveguide communication system of claim 10, wherein the intermediate connector includes a first connector end that establishes signal communication with the node interface and an opposing second connector end that establishes signal communication with the at least one connected node.

12. The radio frequency waveguide communication system of claim 7, wherein the interface sensor node, the adapter housing, and the sub-flange are fabricated as a single integral component such that the radio frequency adapter is configured to detach completely from the at least one waveguide.

13. The radio frequency waveguide communication system of claim 7, wherein the interface sensor node, the adapter housing, and the sub-flange are separate individual components, and wherein the interface sensor node is configured to detach from the adapter housing.

14. A radio frequency interface module comprising:
    at least one detachable portion configured to detach from at least one waveguide;
    a smart node configured to generate a data signal based on a radio frequency signal and to send the data signal to at least one connected node, the smart node comprising:
    at least one antenna; and
    a transceiver processor configured to convert the radio frequency signal into the data signal compatible with the at least one connected node and to convert a node signal into the radio frequency signal,
    wherein the at least one antenna and the transceiver processor are disposed on a printed circuit board disposed in a conduit of the at least one waveguide.

15. The radio frequency interface module of claim 14, further comprising:
    a radio frequency adapter including the at least one detachable portion.

16. The radio frequency interface module of claim 15, wherein the radio frequency adapter comprises:
    an adapter housing configured to support a wiring network including one or more lead wires;
    a sub-flange configured to couple the adapter housing to the distal end of the conduit; and
    an interface sensor node including an adapter end configured to establish connection to the adapter housing and a node end configured to establish connection to the at least one connected node.

17. The radio frequency interface module of claim 16, wherein the interface sensor node includes at least one wire lead pathway configured to convey a lead wire from the adapter end to the node end.

18. The radio frequency interface module of claim 17, wherein the at least one lead wire includes a first wire end in signal communication with the transceiver and an opposing second end in signal communication with the at least one connected node.

* * * * *